(12) United States Patent
Suzuki

(10) Patent No.: US 12,449,785 B2
(45) Date of Patent: Oct. 21, 2025

(54) NUMERICAL CONTROLLER, MACHINE TOOL, AND CONTROL METHOD FOR MACHINE TOOL

(71) Applicant: Fanuc Corporation, Yamanashi (JP)

(72) Inventor: Yoshiyuki Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 375 days.

(21) Appl. No.: 18/020,121

(22) PCT Filed: Aug. 17, 2021

(86) PCT No.: PCT/JP2021/029979
§ 371 (c)(1),
(2) Date: Feb. 7, 2023

(87) PCT Pub. No.: WO2022/039142
PCT Pub. Date: Feb. 24, 2022

(65) Prior Publication Data
US 2023/0359164 A1   Nov. 9, 2023

(30) Foreign Application Priority Data
Aug. 20, 2020   (JP) ................. 2020-139579

(51) Int. Cl.
*G05B 19/4067*   (2006.01)
(52) U.S. Cl.
CPC ........... *G05B 19/4067* (2013.01); *G05B 2219/50112* (2013.01)
(58) Field of Classification Search
None
See application file for complete search history.

(56) References Cited

U.S. PATENT DOCUMENTS

| 4,723,219 A | 2/1988 | Beyer et al. |
| 4,799,408 A | 1/1989 | Elman |

(Continued)

FOREIGN PATENT DOCUMENTS

| CN | 107077122 A | 8/2017 |
| JP | S62-054649 A | 3/1987 |

(Continued)

OTHER PUBLICATIONS

Notice of Allowance (Decision to Grant a Patent) issued Sep. 24, 2024, by the Japan Patent Office in corresponding Japanese Patent Application No. 2022-543943 and an English translation of the Notice of Allowance. (5 pages).

(Continued)

*Primary Examiner* — Ryan A Jarrett
(74) *Attorney, Agent, or Firm* — Buchanan Ingersoll & Rooney PC

(57) ABSTRACT

A numerical controller includes an extraction unit configured to extract at least one non-machining section from a tool path based on sensor information indicating a physical quantity detected by a sensor, a tool moving along the tool path, and the tool and a workpiece not coming into contact with each other in the non-machining section, a setting unit configured to set an end position of reverse movement in one non-machining section among the at least one non-machining section extracted by the extraction unit, the tool reversing along the tool path in the reverse movement, and a control unit configured to control the reverse movement.

8 Claims, 6 Drawing Sheets

(56) References Cited

U.S. PATENT DOCUMENTS

| | | | |
|---|---|---|---|
| 5,043,644 A | 8/1991 | Sassaki et al. | |
| 2015/0153719 A1 | 6/2015 | Tsuda et al. | |
| 2017/0315535 A1 | 11/2017 | Ishii et al. | |
| 2019/0294144 A1* | 9/2019 | Takahara | G05B 23/0221 |
| 2020/0133230 A1 | 4/2020 | Goto et al. | |

FOREIGN PATENT DOCUMENTS

| | | |
|---|---|---|
| JP | 02155004 A | 6/1990 |
| JP | 2000-089813 A | 3/2000 |
| JP | 2007188170 A | 7/2007 |
| JP | 2014-049029 A | 3/2014 |
| JP | 2018-060500 A | 4/2018 |
| JP | 2018156652 A | 10/2018 |
| JP | 2019-159759 A | 9/2019 |
| JP | 2019169003 A | 10/2019 |
| KR | 10-2019-0106241 A | 9/2019 |
| WO | 2014181424 A1 | 11/2014 |

OTHER PUBLICATIONS

International Search Report and Written Opinion for International Application No. PCT/JP2021/029979, dated Nov. 2, 2021, 6 pages.
Office Action (Notice of Reasons for Refusal) issued Jun. 4, 2024, by the Japan Patent Office in corresponding Japanese Patent Application No. 2022-543943 and an English translation of the Office Action. (8 pages).
Notice of Allowance (Notification to Grant Patent Right) issued May 23, 2025, by the National Intellectual Property Administration, P. R. China in corresponding Chinese Patent Application No. 202180051242.1 and an English translation of the Notice of Allowance. (4 pages).

* cited by examiner

NUMERICAL CONTROLLER, MACHINE TOOL, AND CONTROL METHOD FOR MACHINE TOOL

CROSS REFERENCE TO RELATED APPLICATIONS

This is the U.S. National Phase application of PCT/JP2021/029979, filed Aug. 17, 2021, which claims priority to Japanese Patent Application No. 2020-139579, filed Aug. 20, 2020, the disclosures of each of these applications being incorporated herein by reference in their entireties for all purposes.

FIELD OF THE INVENTION

The present invention relates to a numerical controller, a machine tool, and a control method for the machine tool.

BACKGROUND OF THE INVENTION

Conventionally, there has been known a machine tool having a reversing function for reversing a tool along a machining path (Patent Document 1). For example, when an abnormality occurs in the machine tool during machining of a workpiece and machining is suspended, the tool may be returned along the machining path by the reversing function. When the tool returns to a position where the tool does not come into contact with the workpiece by the reversing function, for example, an operator may manually move the tool to a tool change position.

PATENT DOCUMENT

Patent Document 1: JP H2-155004 A

SUMMARY OF THE INVENTION

However, in the conventional machine tool, when the reversing function is used, the operator needs to check a section in which the tool and the workpiece do not come into contact with each other such as a rapid traverse section by referring to a machining program. Alternatively, the operator needs to return the tool to a position where the tool and the workpiece do not come into contact with each other while visually checking movement of the tool. For this reason, an operation time of the operator becomes longer when an operation of returning the tool along the machining path is performed. As a result, a work time of the machine tool is shortened, and there is concern that productivity may be lowered.

An object of the invention is to provide a numerical controller, a machine tool, and a control method for the machine tool capable of reducing an operation time of the operator when the tool is reversely moved.

A numerical controller includes an extraction unit configured to extract at least one non-machining section from a tool path based on sensor information indicating a physical quantity detected by a sensor, a tool moving along the tool path, and the tool and a workpiece not coming into contact with each other in the non-machining section, a setting unit configured to set an end position of reverse movement in one non-machining section among the at least one non-machining section extracted by the extraction unit, the tool reversing along the tool path in the reverse movement, and a control unit configured to control the reverse movement.

A control method for a machine tool, the control method including extracting at least one non-machining section from a tool path based on sensor information indicating a physical quantity detected by a sensor, a tool moving along the tool path, and the tool and a workpiece not coming into contact with each other in the non-machining section, setting an end position of reverse movement in one non-machining section among the at least one extracted non-machining section, the tool reversing along the tool path in the reverse movement, and controlling the reverse movement.

According to the invention, it is possible to reduce an operation time of an operator when a tool is reversed.

DETAILED DESCRIPTION OF EMBODIMENTS OF THE INVENTION

An embodiment of the invention will be described below with reference to the drawings.

Figure 1:
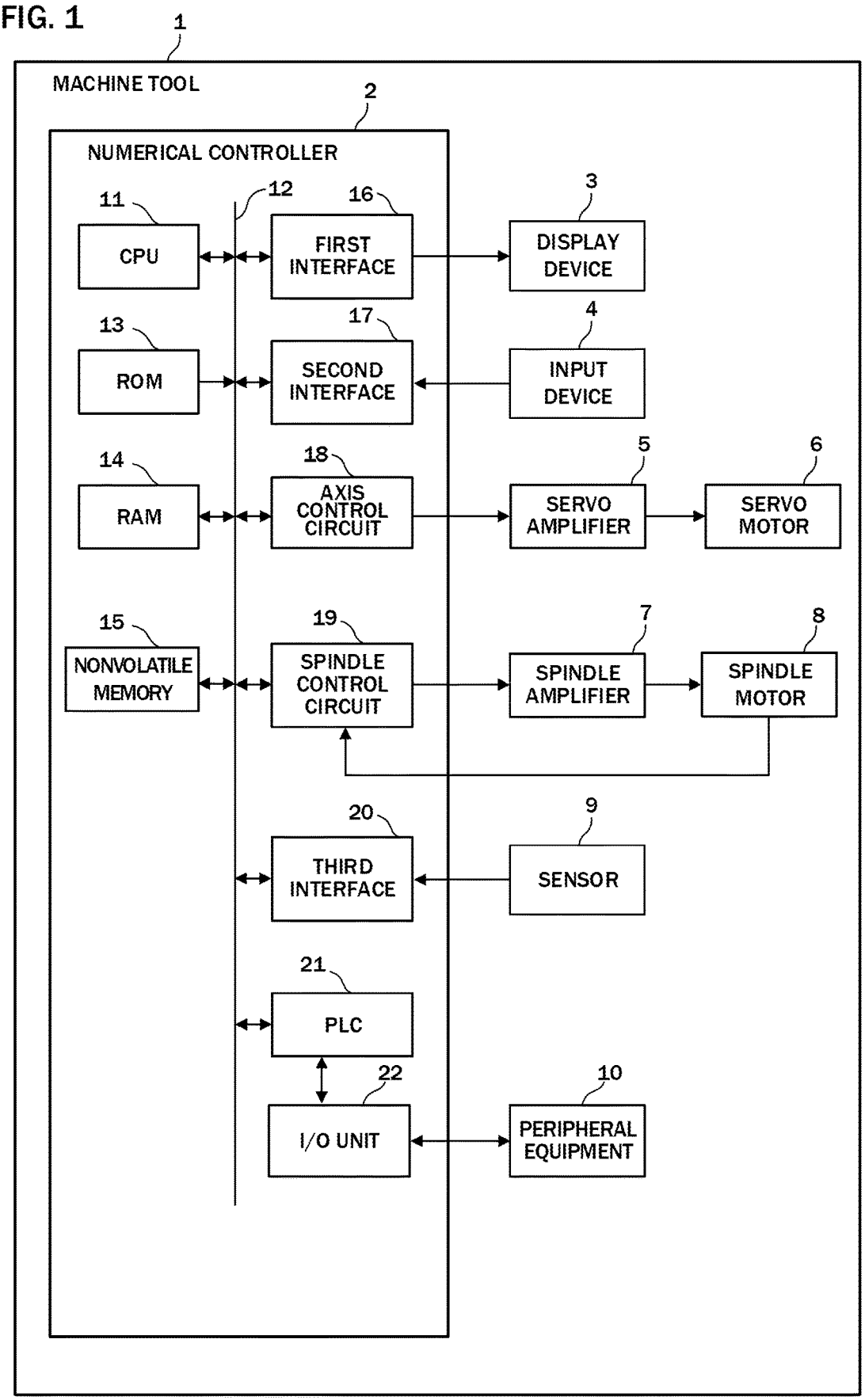
FIG. 1 is a diagram illustrating an example of a hardware configuration of a machine tool.

FIG. 1 is a diagram illustrating an example of a hardware configuration of a machine tool of the present embodiment. The machine tool 1 is a machine that machines a workpiece using a tool. The machine tool 1 machines the workpiece using a tool such as an end mill, a cutting tool, or a drill. For example, the machine tool 1 is a machining center, a lathe, a drilling machine, or a multitasking machine.

The machine tool 1 includes a numerical controller 2, a display device 3, an input device 4, a servo amplifier 5, a servo motor 6, a spindle amplifier 7 and spindle motor 8, a sensor 9, and peripheral equipment 10.

The numerical controller 2 is a device that controls the entire machine tool 1.

The numerical controller 2 includes a CPU (Central Processing Unit) 11, a bus 12, a ROM (Read Only Memory) 13, a RAM (Random Access Memory) 14, and a nonvolatile memory 15.

The CPU 11 is a processor that controls the entire numerical controller 2 according to a system program. The CPU 11 reads a system program, etc. stored in the ROM 13 via a bus 12. In addition, the CPU 11 controls the servo motor 6 and spindle motor 8, etc. according to a machining program, and machines the workpiece.

The bus 12 is a communication path that connects respective pieces of hardware in the numerical controller 2 to each other. The respective pieces of hardware in the numerical controller 2 exchanges data via the bus 12.

The ROM 13 is a storage device that stores a system program for controlling the entire numerical controller 2 and an analysis program or the like for analyzing various data.

The RAM 14 is a storage device that temporarily stores various data. The RAM 14 temporarily stores data related to a tool path calculated by analyzing a machining program, data for display, data input from the outside, etc. The RAM 14 functions as a work area used when the CPU 11 processes various data.

The nonvolatile memory 15 is a storage device that retains data even in a state where power of the machine tool 1 is turned off and power is not supplied to the numerical controller 2. The nonvolatile memory 15 includes, for example, an SSD (Solid State Drive). For example, the nonvolatile memory 15 stores information about tool specifications such as a tool diameter input from the input device 4, information about tool correction, information about a tool lifespan, and a machining program.

The numerical controller 2 further includes a first interface 16, a second interface 17, an axis control circuit 18, a spindle control circuit 19, a third interface 20, a PLC (Programmable Logic Controller) 21, and an I/O unit 22.

The first interface 16 is an interface that connects the bus 12 and the display device 3 to each other. For example, the first interface 16 sends various data processed by the CPU 11 to the display device 3.

The display device 3 is a device that receives various data via the first interface 16 and displays the various data. For example, the display device 3 displays a machining program, information about tool correction, etc. stored in the nonvolatile memory 15. The display device 3 is a display such as an LCD (Liquid Crystal Display).

The second interface 17 is an interface that connects the bus 12 and the input device 4 to each other. For example, the second interface 17 sends data input from the input device 4 to the CPU 11 via the bus 12.

The input device 4 is a device for inputting various data. For example, the input device 4 receives input of information about tool correction and information about tool specifications, and sends the input data to the nonvolatile memory 15 via the second interface 17. For example, the input device 4 is a keyboard and a mouse. Note that the input device 4 and the display device 3 may be configured as, for example, one device such as a touch panel.

The axis control circuit 18 is a control circuit that controls the servo motor 6. The axis control circuit 18 receives a control command from the CPU 11 and outputs a command for driving the servo motor 6 to the servo amplifier 5. The axis control circuit 18 sends, for example, a torque command for controlling torque of the servo motor 6 to the servo amplifier 5. In addition, the axis control circuit 18 may send a rotation speed command for controlling a rotation speed of the servo motor 6 to the servo amplifier 5.

The servo amplifier 5 receives a command from the axis control circuit 18 and supplies power to the servo motor 6.

The servo motor 6 is a motor driven by receiving power supply from the servo amplifier 5. The servo motor 6 is connected to, for example, a ball screw that drives a tool post, a spindle head, and a table. By driving the servo motor 6, for example, configuration elements of the machine tool 1 such as the tool post, the spindle head, and the table move in an X-axis direction, a Y-axis direction, or a Z-axis direction.

The spindle control circuit 19 is a control circuit for controlling the spindle motor 8. The spindle control circuit 19 receives a control command from the CPU 11 and outputs a command for driving the spindle motor 8 to the spindle amplifier 7. For example, the spindle control circuit 19 sends a torque command for controlling torque of the spindle motor 8 to the spindle amplifier 7. In addition, the spindle control circuit 19 may send a rotation speed command for controlling a rotation speed of the spindle motor 8 to the spindle amplifier 7.

The spindle amplifier 7 receives a command from the spindle control circuit 19 and supplies power to the spindle motor 8.

The spindle motor 8 is a motor driven by receiving power supply from the spindle amplifier 7. The spindle motor 8 is connected to a spindle and rotates the spindle.

The third interface 20 is an interface that connects the bus 12 and the sensor 9 to each other. The third interface 20 sends data representing various physical quantities detected by the sensor 9 to the CPU 11 via the bus 12.

The sensor 9 is disposed in each configuration element of the machine tool 1 and detects various physical quantities from each configuration element. The sensor 9 is, for example, a current detection sensor, a sound detection sensor, an AE (Acoustic Emission) sensor, an acceleration sensor, or a position detection sensor.

For example, the current detection sensor is disposed in the servo motor 6 and the spindle motor 8, and detects currents supplied to the servo motor 6 and the spindle motor 8.

For example, the sound detection sensor detects volume of sound in a machining area in the machine tool 1.

For example, the AE sensor detects elastic waves emitted from the workpiece during machining.

For example, the acceleration sensor is disposed near the spindle, and detects vibration occurring near the spindle.

The position detection sensor detects a position of a configuration element of the machine tool 1 such as the tool post, the spindle head, or the table. The axis control circuit 18 may perform feedback control using sensor data detected by the position detection sensor.

In addition, the position detection sensor may be a position coder that detects a rotation angle of the spindle. The position coder outputs a feedback pulse according to the rotation angle of the spindle. The spindle control circuit 19 may perform feedback control using the feedback pulse output from the position coder.

The PLC 21 is a controller that controls the peripheral equipment 10 by executing a ladder program. The PLC 21 controls the peripheral equipment 10 via the I/O unit 22.

The I/O unit 22 is an interface that connects the PLC 21 and the peripheral equipment 10 to each other. The I/O unit 22 sends a command received from the PLC 21 to the peripheral equipment 10.

The peripheral equipment 10 is a device installed in the machine tool 1 to perform an auxiliary operation when the machine tool 1 machines the workpiece. The peripheral equipment 10 may be a device installed around the machine tool 1. For example, the peripheral equipment 10 is a tool changer and a robot such as a manipulator.

Next, functions of the numerical controller 2 will be described.

Figure 2:
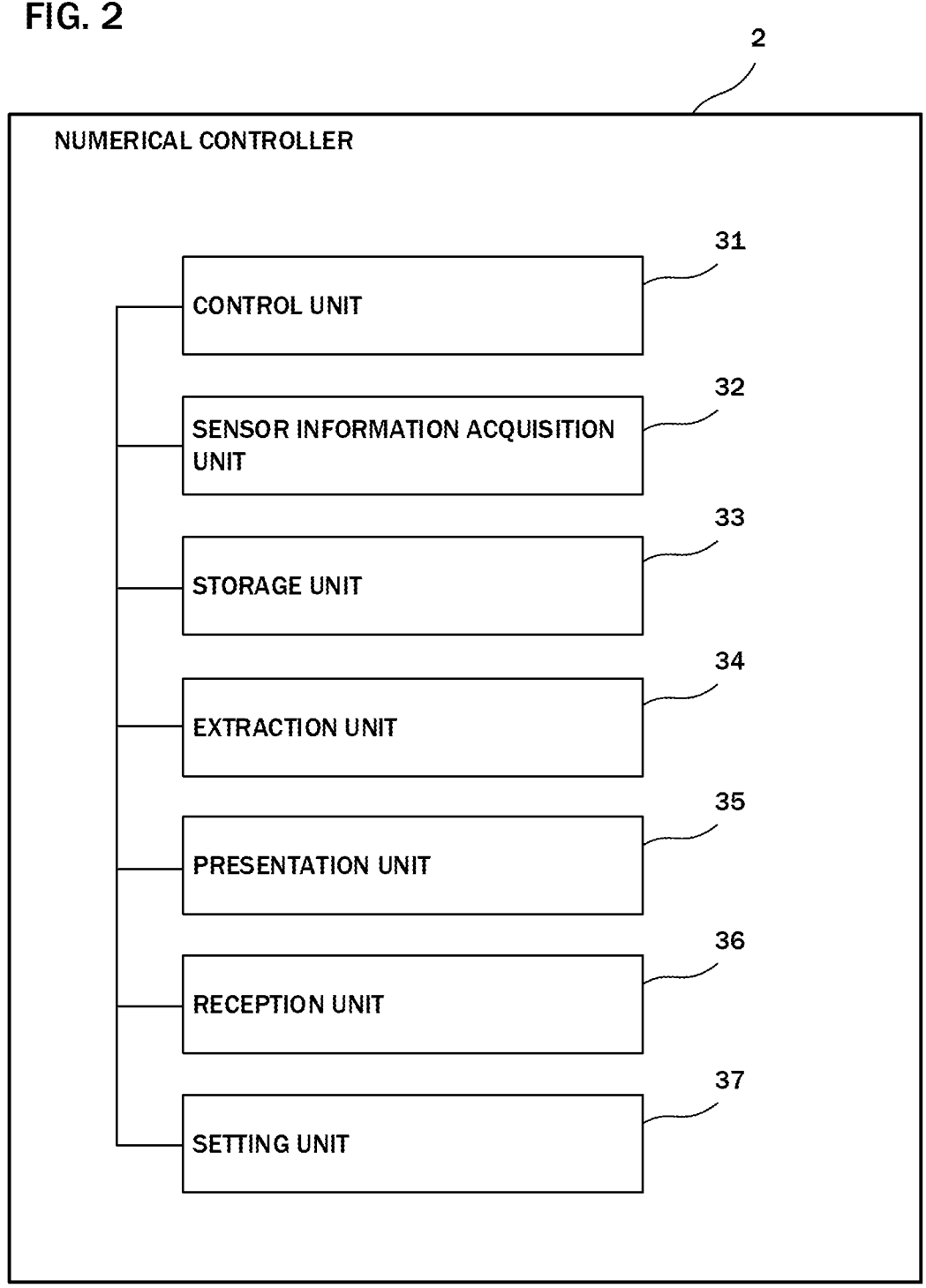
FIG. 2 is a block diagram illustrating an example of a function of a numerical controller.

FIG. 2 is a block diagram illustrating an example of functions of the numerical controller 2. For example, the numerical controller 2 includes a control unit 31, a sensor information acquisition unit 32, a storage unit 33, an extraction unit 34, a presentation unit 35, a reception unit 36, and a setting unit 37.

For example, the control unit 31, the sensor information acquisition unit 32, the extraction unit 34, the presentation unit 35, the reception unit 36, and the setting unit 37 are realized by the CPU 11 performing arithmetic processing using a system program stored in the ROM 13 and various data. The CPU 11 uses the RAM 14 as a work area to perform arithmetic processing. In addition, the storage unit 33 is realized by storing data input from the input device 4, etc., or a result of arithmetic processing by the CPU 11 in the RAM 14 or the nonvolatile memory 15.

For example, the control unit 31 controls the servo motor 6 and the spindle motor 8, and machines the workpiece.

The control unit 31 analyzes a machining program, and calculates a tool path along which the tool moves during machining, a speed of a feed axis (feed rate) of the tool, and the rotation speed of the spindle. The control unit 31 controls the servo motor 6 and the spindle motor 8 so that the spindle is rotated at the calculated rotation speed, and the tool moves at the calculated feed rate along the calculated tool path. In this way, machining is performed.

The sensor information acquisition unit 32 acquires sensor information indicating various physical quantities detected by the sensor 9. The sensor information acquisition unit 32 acquires, for example, information about a current value of a current supplied to the servo motor 6 or the spindle motor 8 from the current detection sensor. In other words, the sensor information is information indicating the load of the motor such as the servo motor 6 or the spindle motor 8.

In addition, the sensor information acquisition unit 32 may acquire information about sound volume in the machining area detected by the sound detection sensor. Further, the sensor information acquisition unit 32 may acquire information about elastic waves acquired by the AE sensor.

The storage unit 33 stores various information. For example, the storage unit 33 stores information indicating a tool path when machining is performed. For example, the information indicating the tool path is a movement path of a tip of the tool during machining, and includes a set of data indicating coordinate values.

In addition, the storage unit 33 stores information in which sensor information acquired by the sensor information acquisition unit 32 and information indicating the tool path are associated with each other. For example, this information is information in which a coordinate value of a position passed by the tool when the workpiece is machined and sensor information acquired when the tool passes through the position indicated by this coordinate value are associated with each other. Note that the case where machining is performed is the case where the tool is moved according to a machining program, and includes the case where the tool is moved by cutting feed and the case where the tool is moved by rapid traverse during a tool positioning operation, etc.

In addition, the storage unit 33 may store information about tool specifications and information about a shape of the workpiece. The information about the tool specifications is, for example, information indicating a tool diameter of the tool.

The extraction unit 34 extracts a non-machining section and a machining section from the tool path when machining is performed.

The non-machining section is a section in which the tool and the workpiece do not come into contact with each other during execution of the machining program. The non-machining section may be a section in which the tool moves by cutting feed and the tool and the workpiece do not come into contact with each other. In addition, the non-machining section may be a section in which the tool moves by rapid traverse and the tool and the workpiece do not come into contact with each other.

The machining section is a section in which the tool and the workpiece come into contact with each other and the workpiece is machined by the tool during execution of the machining program.

The extraction unit 34 extracts the machining section and the non-machining section on the tool path based on the information, in which the sensor information and the information indicating the tool path are associated with each other, stored in the storage unit 33.

For example, when the sensor information is information indicating a current value detected by the current detection sensor, the extraction unit 34 extracts a section in which the current value exceeds a predetermined threshold value as the machining section. In addition, the extraction unit 34 extracts a section in which the current value is equal to or less than the predetermined threshold value as the non-machining section. In other words, the extraction unit 34 extracts, as the non-machining section, a section in which there is no cutting resistance and the torque of the servo motor 6 or the spindle motor 8 is lower than that during machining.

Further, the extraction unit 34 may extract the machining section and the non-machining section based on information indicating a detection value detected by the sound detection sensor or the AE sensor.

The extraction unit 34 causes the storage unit 33 to store information specifying the non-machining section on the tool path. The information specifying the non-machining section includes information indicating a coordinate value of the non-machining section.

The presentation unit 35 presents a tool path including the machining section and the non-machining section extracted by the extraction unit 34 to the operator. For example, the presentation unit 35 causes the display device 3 to display information about the tool path.

Here, information about the tool path displayed on the display device 3 will be described.

Figure 3:
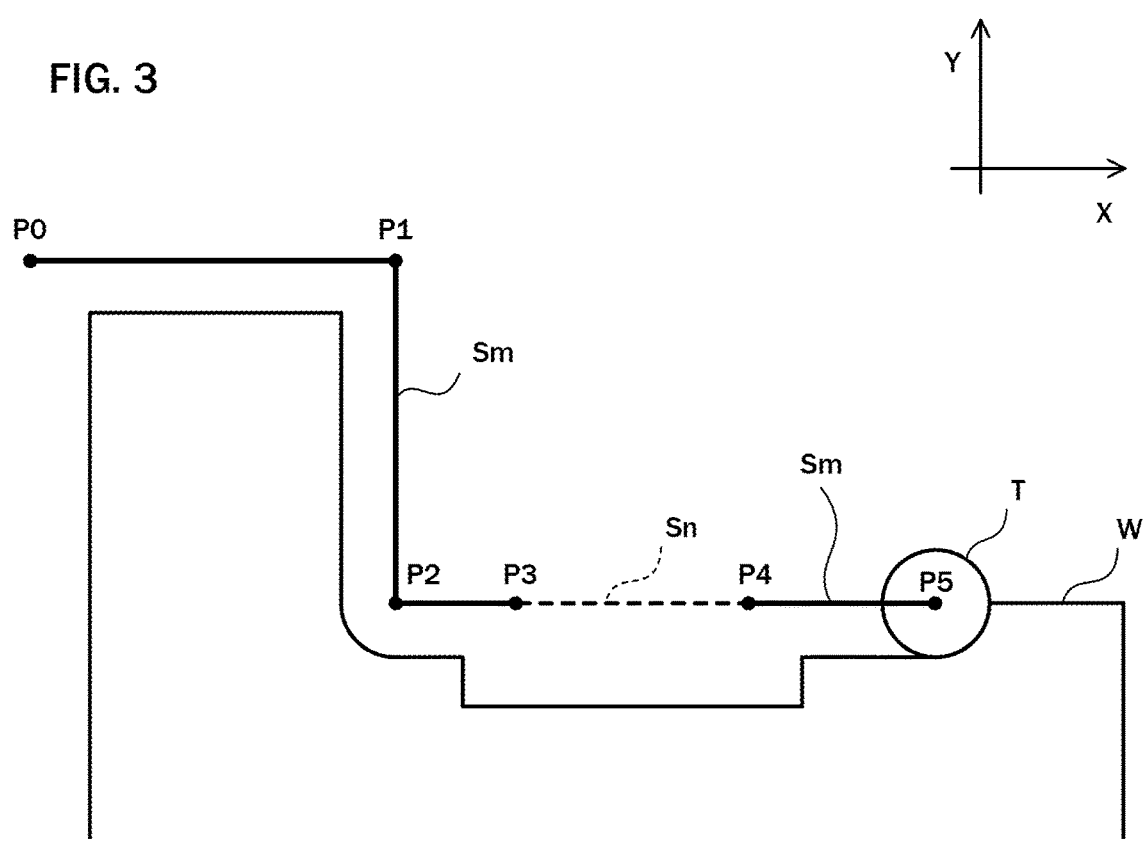
FIG. 3 is a diagram illustrating a display example of a tool path displayed on a display device.

FIG. 3 is a diagram describing a display example of the tool path displayed on the display device 3.

The tool path illustrated in FIG. 3 is a path connecting a position P0, a position P1, a position P2, a position P3, a position P4, and a position P5 in order. A tool path from the position P0 to the position P3 and a tool path between the position P4 and the position P5 are displayed by solid lines, indicating that the tool paths are a machining section Sm. A tool path between the position P3 and the position P4 is displayed by a dotted line, indicating that the tool path is a non-machining section Sn. At the position P5, machining of the workpiece by the tool T is suspended due to some event occurring in the machine tool 1. Here, for example, some event is detection of breakage of the tool T.

Returning to description of FIG. 2, the reception unit 36 receives information that specifies the non-machining section Sn presented to a user by the presentation unit 35 and selected by the user. For example, when the non-machining section Sn displayed on the display device 3 is selected by the user on the display device 3, the reception unit 36 receives information specifying the selected non-machining section Sn.

The setting unit 37 sets an end position of reverse movement in which the tool T reverses along the tool path in the non-machining section Sn selected by the user. For example, when the tool T reversely moves, the setting unit 37 sets, as the end position, a position at a predetermined distance from the position P4 at which the machining section Sm is switched to the non-machining section Sn.

Figure 4:
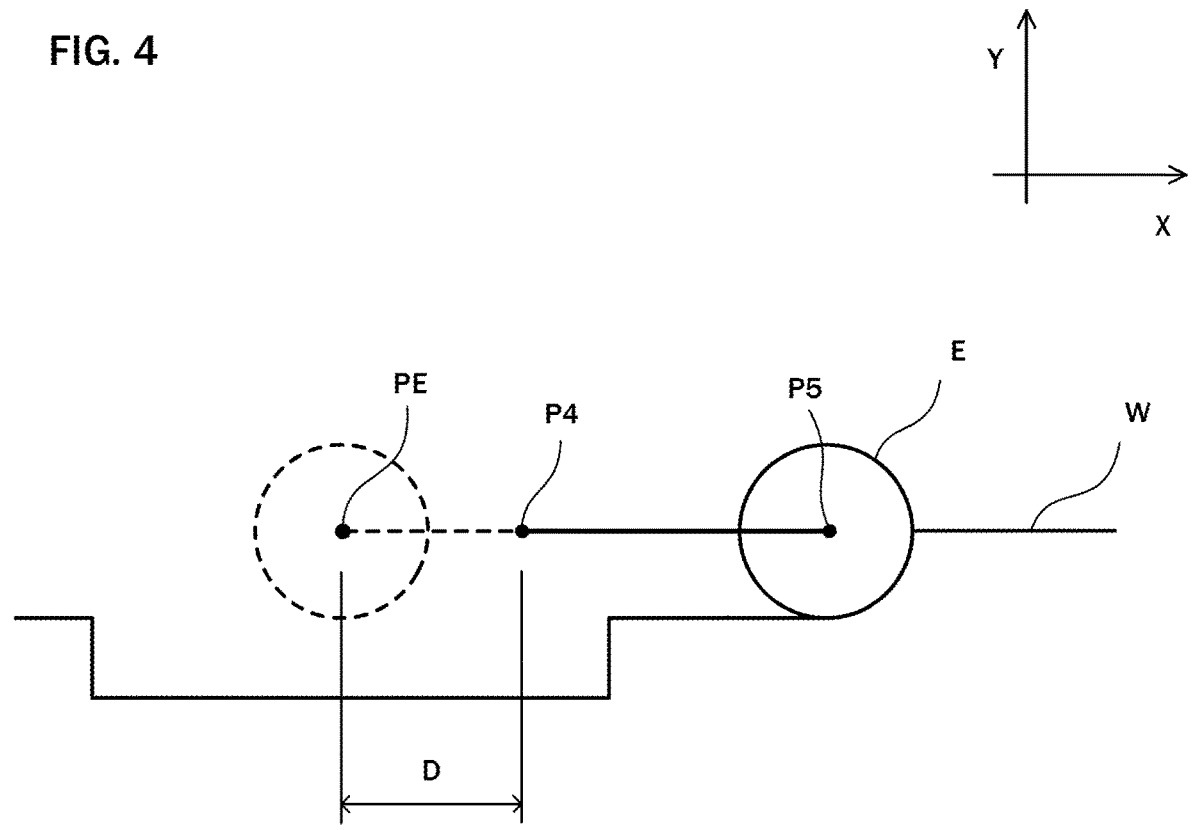
FIG. 4 is a diagram for describing an example of an end position of reverse movement.

FIG. 4 is a diagram describing an example of the end position of the reverse movement. In FIG. 4, a position separated by a predetermined distance D from the position P4 at which the machining section Sm is switched to the non-machining section Sn is set to an end position PE. For example, the predetermined distance D is set based on a value indicating the predetermined distance D input to the input device 4.

In addition, for example, the predetermined distance D is set based on specification information of the tool T stored in the storage unit 33. The predetermined distance D is, for example, a value obtained by multiplying the tool diameter of the tool by a predetermined real number.

When the setting unit 37 sets the end position PE of the reverse movement, the control unit 31 controls the servo motor 6 and the spindle motor 8 to reversely move the tool T to the end position PE. When the tool reaches the end position PE, for example, the tool T retracts from the workpiece W by a manual operation of the user, and the tool T is changed.

Next, a description will be given of processing executed in the numerical controller 2 when the workpiece W is machined.

Figure 5:
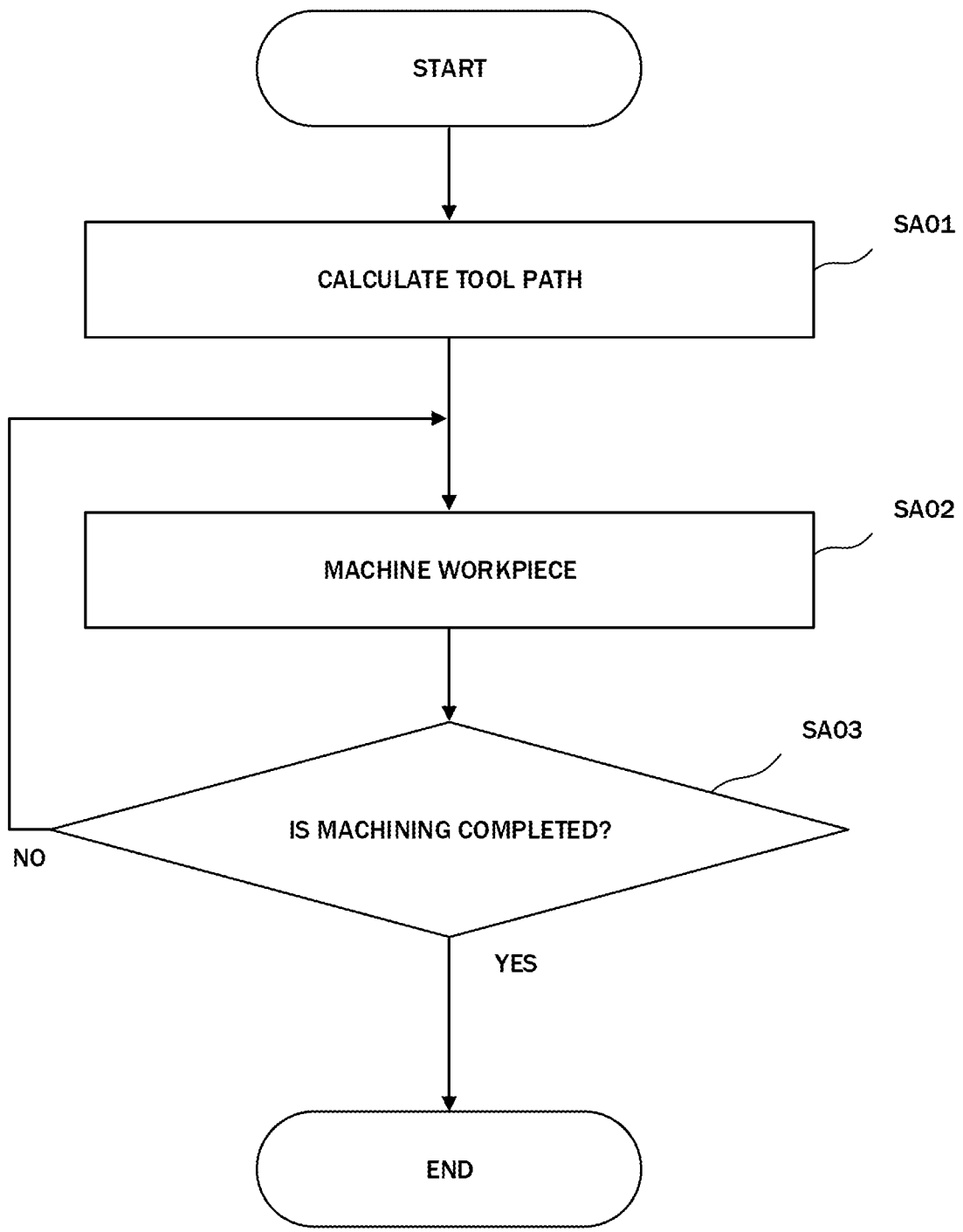
FIG. 5 is a diagram for describing an example of processing executed when machining of a workpiece is performed.

FIG. 5 is a diagram for describing an example of processing executed when the workpiece W is machined.

The control unit 31 analyzes the machining program and calculates the tool path (step SA01).

Next, the control unit 31 controls the servo motor 6 and the spindle motor 8 based on the machining program to machine the workpiece W (step SA02).

While the workpiece W is machined, the sensor information acquisition unit 32 acquires sensor information indicating a physical quantity detected by the sensor 9. In addition, the storage unit 33 stores information in which the sensor information acquired by the sensor information acquisition unit 32 and the information indicating the tool path are associated with each other.

Next, the control unit 31 determines whether or not machining of the workpiece W is completed (step SA03). When the machining of the workpiece W is completed (Yes in step SA03), the process is terminated. When the machining of the workpiece W is not completed (No in step SA03), the control unit 31 continues the machining of the workpiece W (step SA02).

Next, a description will be given of processing executed when machining is suspended due to some event occurring during execution of the machining program.

Figure 6:
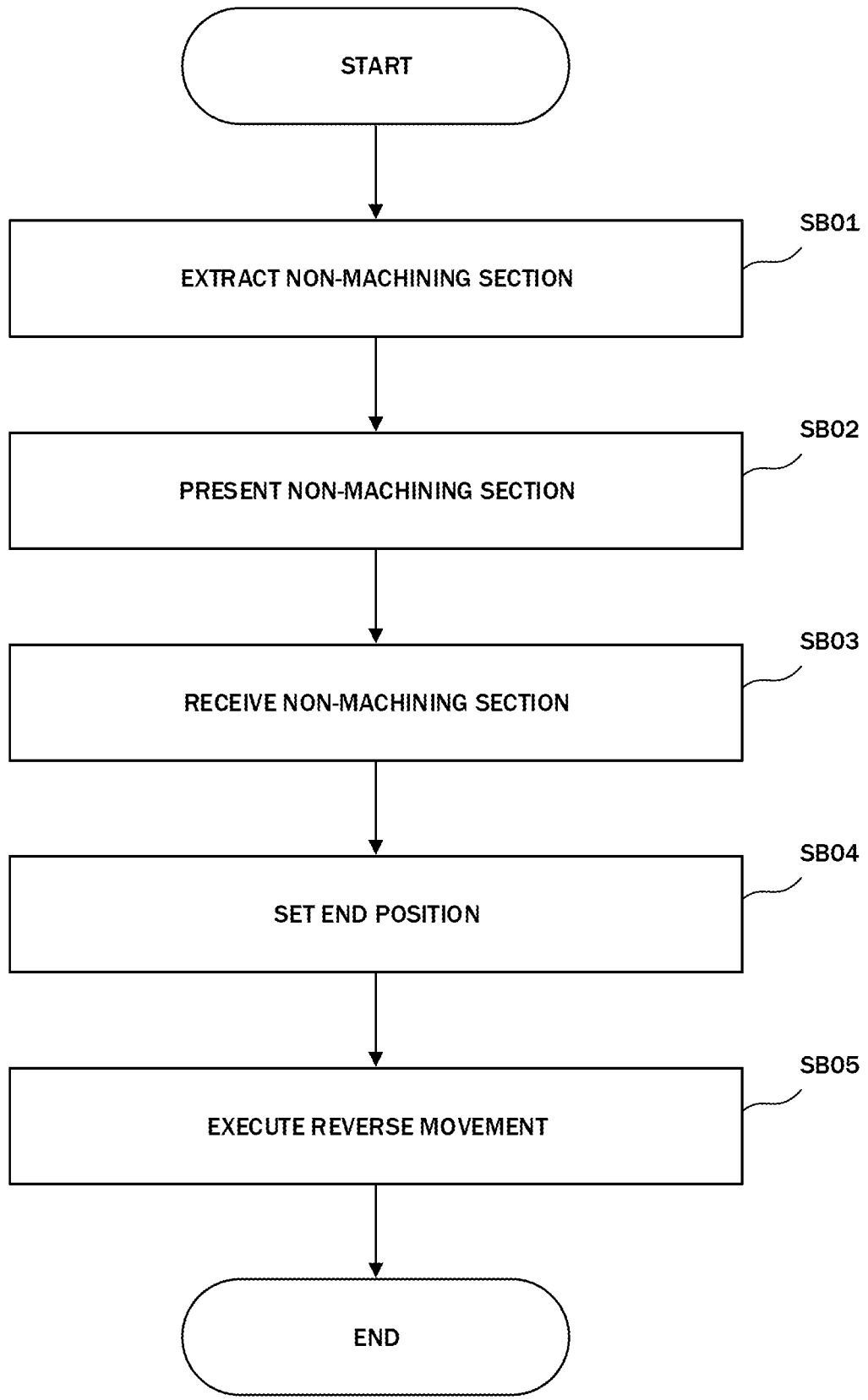
FIG. 6 is a diagram for describing an example of processing performed when machining is suspended during execution of a machining program.

FIG. 6 is a diagram illustrating an example of processing performed when machining is suspended during execution of a machining program.

When machining of the workpiece W by the tool T is suspended, the extraction unit 34 extracts the non-machining section Sn based on information, in which the sensor information and the information indicating the tool path are associated with each other, stored in the storage unit 33 (step SB01).

Next, the presentation unit 35 presents the non-machining section Sn to the user (step SB02).

Next, the reception unit 36 receives information specifying the non-machining section Sn selected by the user (step SB03).

Next, the setting unit 37 sets the end position PE based on the information specifying the non-machining section Sn received by the reception unit 36 (step SB04).

Next, the control unit 31 reversely moves the tool to the end position PE determined by the setting unit 37 (step SB05). The process ends when the tool reaches the end position PE.

As described above, the numerical controller 2 of the present embodiment includes the extraction unit 34 that extracts the non-machining section Sn in which the tool T and the workpiece W do not come into contact with each other from the tool path along which the tool T moves, based on the sensor information indicating the physical quantity detected by the sensor 9, the setting unit 37 that sets the end position of the reverse movement in which the tool T reverses along the tool path in the non-machining section Sn extracted by the extraction unit 34, and the control unit 31 that controls the reverse movement.

For this reason, the tool T may be automatically and reliably moved to a position where the tool T and the workpiece W do not come into contact with each other. As a result, it is possible to reduce the operation time of the user when the tool T is reversed. In addition, regardless of a skill level of the user (operator), it is possible to reduce a possibility of adversely affecting a machined surface when the tool T is reversed. Furthermore, regardless of the skill level of the user, it is possible to reduce a possibility of collision between the tool T and the workpiece W when the tool T is reversed.

In addition, the numerical controller 2 further includes the reception unit 36 that receives information specifying the non-machining section Sn selected by the user, and the setting unit 37 sets the end position PE of the non-machining section Sn based on the information received by the reception unit 36.

For this reason, the tool T may be automatically and reliably moved to the position where the tool T and the workpiece W do not come into contact with each other. As a result, it is possible to reduce the operation time of the user when the tool T is reversed.

Further, in the present embodiment, the end position PE is a position at the predetermined distance D from the position P4 where the machining section Sm is switched to the non-machining section Sn when the tool T reversely moves, and the reception unit 36 further receives information indicating the predetermined distance D.

For this reason, the user may set a position in the non-machining section Sn at which the tool T is stopped. As a result, it is possible to reduce the operation time of the user when the tool T is reversed.

Further, in the present embodiment, the reception unit 36 receives specification information indicating specifications of the tool T, and the end position is determined based on the specification information. For this reason, each tool may be stopped at an appropriate position.

Further, in the present embodiment, information indicating a load of a motor of the machine tool 1 is used as the sensor information. For this reason, the numerical controller 2 can reliably detect the non-machining section Sn.

Note that, in the above-described embodiment, an example in which the extraction unit 34 extracts one non-machining section Sn from the tool path has been described. However, a plurality of non-machining sections Sn may be extracted.

Figure 7:
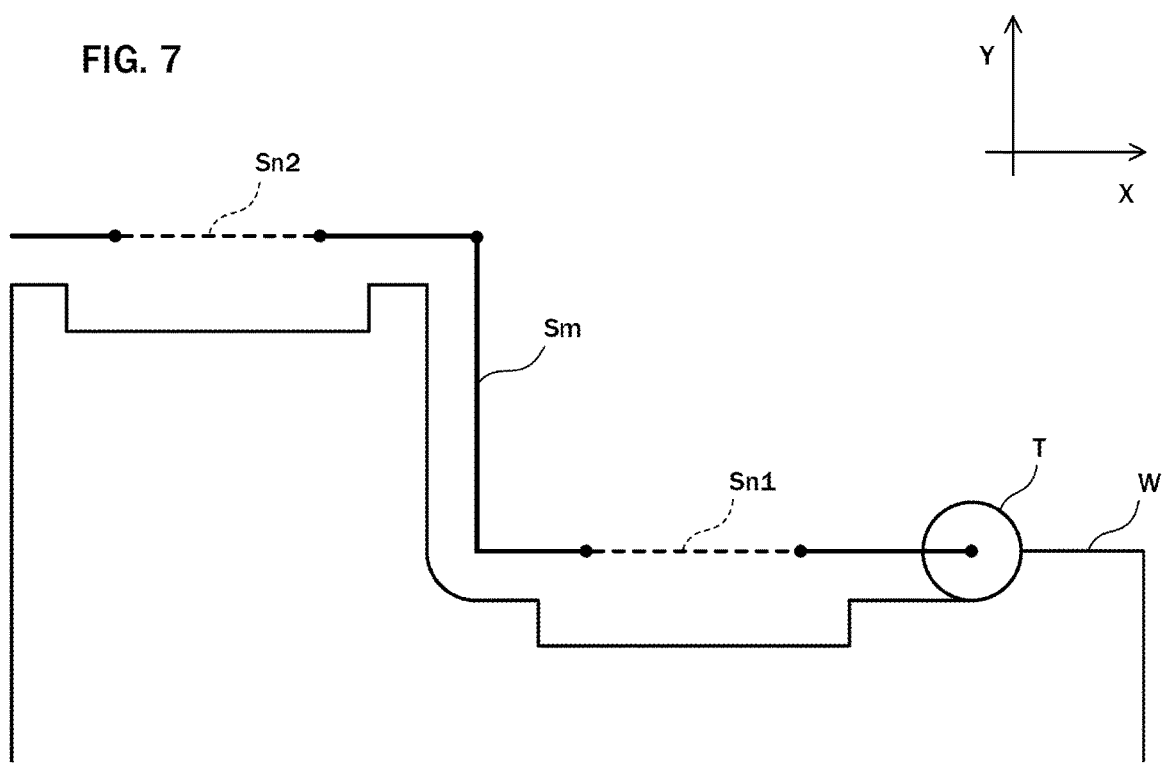
FIG. 7 is a diagram for describing a display example of a tool path displayed on the display device when a plurality of non-machining sections is extracted.

FIG. 7 is a diagram describing a display example of the tool path displayed on the display device 3 when the plurality of non-machining sections Sn is extracted.

In the example illustrated in FIG. 7, the extraction unit 34 extracts a non-machining section Sn1 and a non-machining section Sn2 from the tool path, and the presentation unit 35 presents the non-machining section Sn1 and the non-machining section Sn2.

When the presentation unit 35 causes the display device 3 to display such a tool path, the user selects any one of the non-machining sections Sn1 and Sn2 from the non-machining section Sn1 and the non-machining section Sn2. In this way, the reception unit 36 receives information about the selected non-machining section Sn1 or non-machining section Sn2. Thereafter, the setting unit 37 sets the end position PE in the selected non-machining section Sn1 or non-machining section Sn2.

That is, the user may select one non-machining section Sn1 or non-machining section Sn2 from a plurality of non-machining sections Sn1 and Sn2 extracted by the extraction unit 34 in consideration of retracting the tool T from the workpiece W.

In addition, for example, the presentation unit 35 may cause the display device 3 to display information such as a shape of a jig and an unmachined portion of the workpiece, and various information such as a tool change position.

Figure 8:
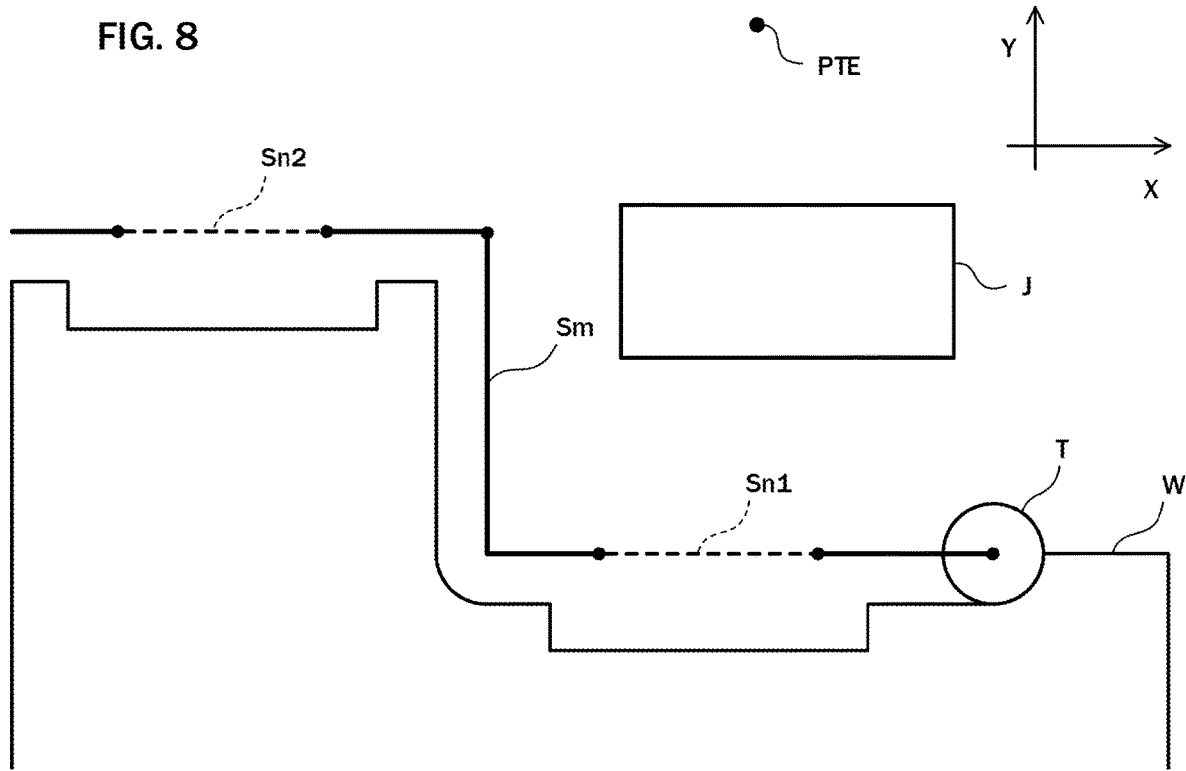
FIG. 8 is a diagram for describing an example in which a presentation unit displays various information on the display device.

FIG. 8 is a diagram for describing an example in which the presentation unit 35 displays various information on the display device 3. In the example illustrated in FIG. 8, information about a jig J and a tool change position PTE is displayed on the display device 3 together with a tool path.

In this way, the user can select the non-machining sections Sn1 and Sn2 in consideration of a position and shape of the jig J and the tool change position PTE.

In the example illustrated in FIG. 8, the jig J is present between the non-machining section Sn1 and the tool change position PTE. At this time, when an attempt is made to manually move the tool T to the tool change position PTE, there is concern that the tool T and the jig J may collide with each other. On the other hand, there is no obstruction between the non-machining section Sn2 and the tool change position PTE. For this reason, even when the tool T is manually moved to the tool change position PTE, there is no concern that the tool T and the jig J may collide with each other.

Note that when various information such as information about the jig J and the tool change position PTE is stored in the storage unit 33, the control unit 31 may select an appropriate non-machining section Sn from a plurality of non-machining sections Sn. In this case, the control unit 31 may select the non-machining section Sn in which the end position PE is set based on a positional relationship between the non-machining section Sn and the tool change position PTE, and data such as shapes of the jig J and an unmachined portion of the workpiece.

EXPLANATIONS OF LETTERS OR NUMERALS

1 MACHINE TOOL
2 NUMERICAL CONTROLLER
3 DISPLAY DEVICE
4 INPUT DEVICE
5 SERVO AMPLIFIER
6 SERVO MOTOR
7 SPINDLE AMPLIFIER
8 SPINDLE MOTOR
9 SENSOR
10 PERIPHERAL EQUIPMENT
11 CPU
12 BUS
13 ROM
14 RAM
15 NONVOLATILE MEMORY
16 FIRST INTERFACE
17 SECOND INTERFACE
18 AXIS CONTROL CIRCUIT
19 SPINDLE CONTROL CIRCUIT
20 THIRD INTERFACE
21 PLC
22 I/O UNIT
31 CONTROL UNIT
32 SENSOR INFORMATION ACQUISITION UNIT
33 STORAGE UNIT
34 EXTRACTION UNIT
35 PRESENTATION UNIT
36 RECEPTION UNIT
37 SETTING UNIT
P0, P1, P2: POSITION
P3, P4, P5: POSITION
PE: END POSITION
Sm MACHINING SECTION
Sn NON-MACHINING SECTION
Sn1, Sn2 NON-MACHINING SECTION
T TOOL
W WORKPIECE
J JIG
PTE TOOL CHANGE POSITION

The invention claimed is:

1. A numerical controller comprising:
a processor configured to:
extract at least one non-machining section from a tool path based on sensor information indicating a physical quantity detected by a sensor, a tool moving along the tool path, and the tool and a workpiece not coming into contact with each other in the non-machining section;
set an end position of reverse movement in one non-machining section among the at least one non-machining section extracted by the extraction unit, the tool reversing along the tool path in the reverse movement;
control the reverse movement; and
receive information specifying the one non-machining section selected by a user among the at least one non-machining section,
wherein the processor sets the end position in the one non-machining section based on the received information.

2. The numerical controller according to claim 1, wherein:
the end position is a position at a predetermined distance from a position where a machining section is switched to the non-machining section when the tool reversely moves; and
the processor further receives information indicating the predetermined distance.

3. The numerical controller according to claim 1, wherein:
the processor further receives specification information indicating specifications of the tool; and
the end position is determined based on the specification information.

4. The numerical controller according to claim 1, wherein the at least one non-machining section includes a plurality of non-machining sections.

5. The numerical controller according to claim 1, wherein the sensor information is information indicating a load of a motor of a machine tool.

6. The numerical controller according to claim 1, wherein the processor extracts the non-machining section from a section of the tool path, the tool moving by cutting feed in the section.

7. A machine tool having the numerical controller according to claim 1.

8. A control method for a machine tool, the control method comprising:
- extracting at least one non-machining section from a tool path based on sensor information indicating a physical quantity detected by a sensor, a tool moving along the tool path, and the tool and a workpiece not coming into contact with each other in the non-machining section;
- setting an end position of reverse movement in one non-machining section among the at least one extracted non-machining section, the tool reversing along the tool path in the reverse movement;
- controlling the reverse movement; and
- receiving information specifying the one non-machining section selected by a user among the at least one non-machining section,
- wherein in the setting the end position is set in the one non-machining section based on the received information.

* * * * *